(12) United States Patent
Kim

(10) Patent No.: US 8,590,378 B2
(45) Date of Patent: Nov. 26, 2013

(54) GYROSCOPE SENSOR CIRCUIT

(75) Inventor: Chang Hyun Kim, Gyunggi-do (KR)

(73) Assignee: Samsung Electro-Mechanics Co., Ltd., Gyunggi-Do (KR)

( * ) Notice: Subject to any disclaimer, the term of this patent is extended or adjusted under 35 U.S.C. 154(b) by 331 days.

(21) Appl. No.: 12/986,736

(22) Filed: Jan. 7, 2011

(65) Prior Publication Data

US 2011/0314911 A1 Dec. 29, 2011

(30) Foreign Application Priority Data

Jun. 24, 2010 (KR) .................. 10-2010-0060218

(51) Int. Cl.
*G01C 19/56* (2012.01)
(52) U.S. Cl.
USPC ..................................... 73/504.12
(58) Field of Classification Search
USPC ............. 73/504.12, 504, 13, 504.14, 504.15, 73/504.16
See application file for complete search history.

(56) References Cited

U.S. PATENT DOCUMENTS

| 7,107,841 B2* | 9/2006 | Mori ..................... 73/504.12 |
| 7,441,459 B2* | 10/2008 | Ohuchi et al. .......... 73/504.16 |
| 2009/0084180 A1* | 4/2009 | Yoshida et al. .......... 73/504.02 |
| 2010/0058862 A1 | 3/2010 | Sugibayashi et al. |

FOREIGN PATENT DOCUMENTS

| JP | 2009031008 A | 2/2009 |
| KR | 1020090133096 A | 12/2009 |
| KR | 20100029708 A | 3/2010 |

OTHER PUBLICATIONS

Office Action corresponding to KR 10-2010-0060218, dated Jan. 16, 2012.

\* cited by examiner

*Primary Examiner* — John Chapman, Jr.
(74) *Attorney, Agent, or Firm* — Lowe Hauptman & Ham, LLP

(57) ABSTRACT

Disclosed is a gyroscope sensor circuit, including a first differential amplifier differentially amplifying signals outputted from first sensing nodes of a gyroscope sensor; a phase shifter shifting a signal from the first differential amplifier by a predetermined shift phase; an amplitude detector detecting the amplitude magnitude of the signal from the first differential amplifier; and a variable gain amplifier amplifying the shifted signal from the phase shifter with gain adjusted depending on the amplitude magnitude from the amplitude detector, and providing the amplified signal to driving nodes of the gyroscope sensor.

17 Claims, 6 Drawing Sheets

DRIVING SIGNAL WHEN AGC IS NOT USED

DETECTION SIGNAL WHEN AGC IS NOT USED

DETECTION SIGNAL WHEN AGC IS USED

GYROSCOPE SENSOR CIRCUIT

CROSS-REFERENCE TO RELATED APPLICATIONS

This application claims the priority of Korean Patent Application No. 10-2010-0060218 filed on Jun. 24, 2010, in the Korean Intellectual Property Office, the disclosure of which is incorporated herein by reference.

BACKGROUND OF THE INVENTION

1. Field of the Invention

The present invention relates to a gyroscope sensor circuit applicable to mobile terminals such as cameras, cell phones, or the like, and more particularly, to a gyroscope sensor circuit capable of maintaining constant amplitude in a driving signal of a gyroscope sensor, decreasing the influence of temperature, and reducing settling time, by using automatic gain control.

2. Description of the Related Art

In general, a gyroscope sensor (i.e. a gyroscope) may measure an angular velocity $\Omega z$ with Coriolis Force ($Fy=\Omega mzVx$) in the state in which a mass body having a certain level of mass m is vibrated at a constant velocity Vx. Here, a velocity Vx should be constant at all times, in order to precisely measure an angular velocity $\Omega z$.

In general, the gyroscope sensor performs self-oscillation by using a feedback circuit. At this time, a velocity Vx is determined according to the resonant frequency of self-oscillation and feedback gain.

However, when the velocity Vx is affected by the temperature characteristics of a mass body, errors in measuring acceleration may occur.

Moreover, in order to enhance the sensitivity of the gyroscope sensor, a mass body having a high Q-factor is used. In the case that the Q-factor is high, the settling time of the self-oscillation of the sensor may be extended.

SUMMARY OF THE INVENTION

An aspect of the present invention provides a gyroscope sensor circuit capable of maintaining constant amplitude in a driving signal of a gyroscope sensor, decreasing the influence of temperature, and reducing settling time, by using automatic gain control.

According to an aspect of the present invention, there is provided a gyroscope sensor circuit including: a first differential amplifier differentially amplifying signals outputted from first sensing nodes of a gyroscope sensor; a phase shifter shifting a signal from the first differential amplifier by a predetermined shift phase; an amplitude detector detecting an amplitude magnitude of the signal from the first differential amplifier; and a variable gain amplifier amplifying the shifted signal from the phase shifter with gain adjusted depending on the amplitude magnitude from the amplitude detector, and providing the amplified signal to driving nodes of the gyroscope sensor.

According to another aspect of the present invention, there is also provided a gyroscope sensor circuit including: a first differential amplifier differentially amplifying signals outputted from first sensing nodes of a gyroscope sensor; a phase shifter shifting a signal from the first differential amplifier by a predetermined shift phase; an amplitude detector detecting an amplitude magnitude of the signal from the first differential amplifier; a variable gain amplifier amplifying the shifted signal from the phase shifter with gain adjusted depending on the amplitude magnitude from the amplitude detector, and providing the amplified signal to driving nodes of the gyroscope sensor; a second differential amplifier differentially amplifying signals outputted from second sensing nodes of the gyroscope sensor; and an acceleration detection circuit detecting acceleration by using a signal from the second differential amplifier.

The phase shifter may set the predetermined shift phase to cause a shift phase of a signal in a signal path including the gyroscope sensor, the first differential amplifier, the phase shifter, and the variable gain amplifier to be 180°, in order to satisfy oscillation conditions.

The variable gain amplifier may have gain by which an open loop gain in the signal path including the gyroscope sensor, the first differential amplifier, the phase shifter, and the variable gain amplifier is set to be "1" or more, in order to satisfy oscillation conditions.

The amplitude detector may further include a first filter allowing a signal having a predetermined band among signals from the first differential amplifier to pass therethrough; an inverter inverting the signal from the first filter; a first comparator generating a switching signal in synchronization with the signal from the first filter; a signal selector selecting one of the signal from the first filter and the signal from the inverter, depending on the switching signal from the first comparator; a second filter allowing a signal having a predetermined band among signals from the signal selector to pass therethrough; and a second comparator comparing the signal from the second filter with a predetermined reference signal, detecting a differential voltage of the compared signals, and providing the differential voltage to the variable gain amplifier.

The variable gain amplifier may include a current regulator adjusting a driving current of the variable gain amplifier, which flows into an operating voltage terminal, depending on the differential voltage outputted from the second comparator; and a variable amplifier circuit having gain adjusted depending on the driving current adjusted by the current regulator.

The current regulator may be configured as a transistor having a drain connected to the operating voltage terminal, a source connected to a power supply terminal of the variable amplifier circuit, and a gate connected to an output terminal of the second comparator.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
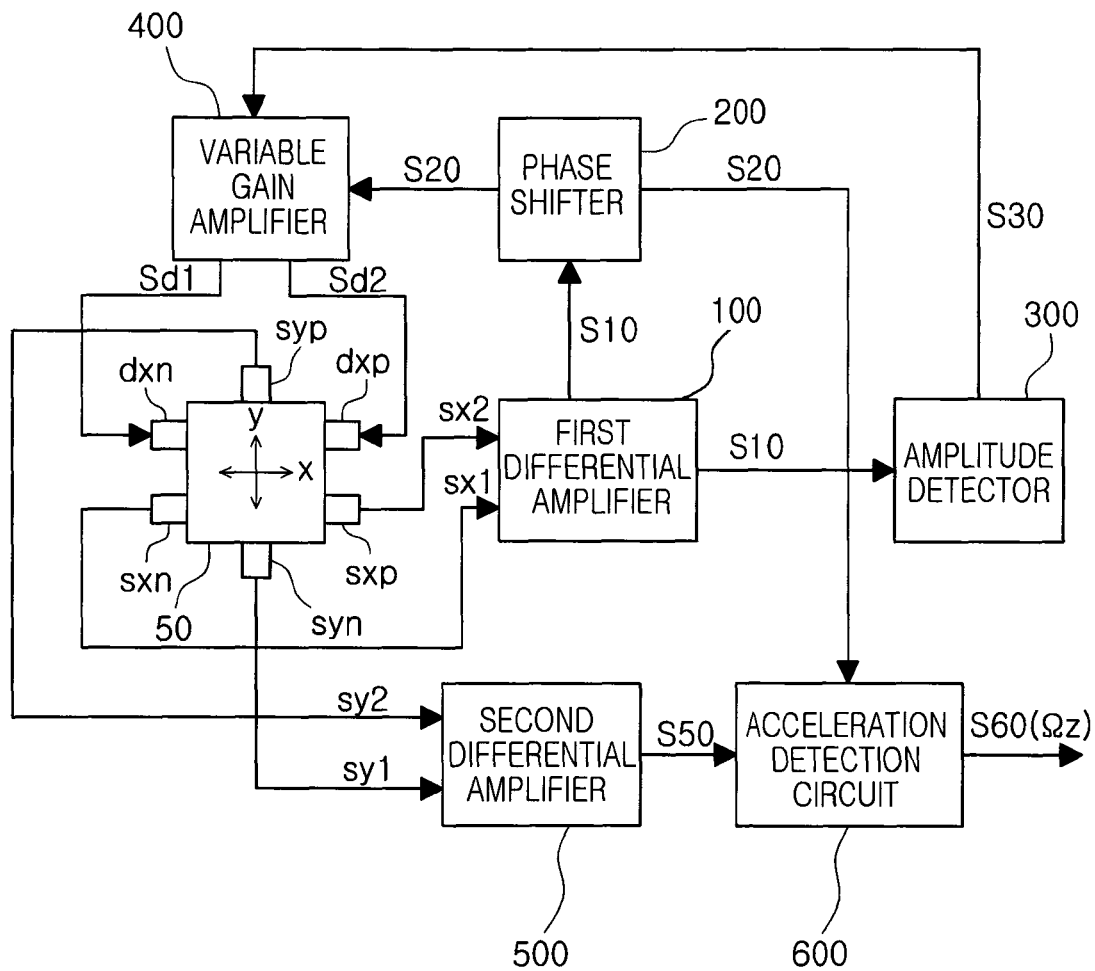
FIG. 1 is a block diagram of a gyroscope sensor circuit according to an exemplary embodiment of the present invention.

Exemplary embodiments of the present invention will now be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. The same or equivalent elements are referred to by the same reference numerals throughout the drawings.

FIG. 1 is a block diagram of a gyroscope sensor circuit according to an exemplary embodiment of the present invention.

Referring to FIG. 1, a gyroscope sensor circuit according to an exemplary embodiment of the present invention may include a first differential amplifier 100 differentially amplifying signals outputted from first sensing nodes sxn and sxp of a gyroscope sensor 50; a phase shifter 200 shifting a signal from the first differential amplifier 100, by a predetermined shift phase; an amplitude detector 300 detecting the amplitude magnitude of the signal from the first differential amplifier 100; and a variable gain amplifier 400 amplifying a signal from the phase shifter 200 with gain adjusted depending on the amplitude magnitude from the amplitude detector 300, and providing the amplified signal to driving nodes dxn and dxp of the gyroscope sensor 50.

In addition, the gyroscope sensor circuit of the present invention may further include a second differential amplifier 500 differentially amplifying signals sy1 and sy2 outputted from second sensing nodes syn and syp of the gyroscope sensor and an acceleration detection circuit 600 detecting acceleration by using a signal S50 from the second differential amplifier 500.

The phase shifter 200 may set the predetermined shift phase to cause a shift phase of a signal in a signal path including the gyroscope sensor 50, the first differential amplifier 100, the phase shifter 200, and the variable gain amplifier 400 to be 180°, in order to satisfy oscillation conditions.

The variable gain amplifier 400 may have gain by which an open loop gain in the signal path including the gyroscope sensor 50, the first differential amplifier 100, the phase shifter 200, and the variable gain amplifier 400 is set to be "1" or more, in order to satisfy oscillation conditions.

Figure 2:
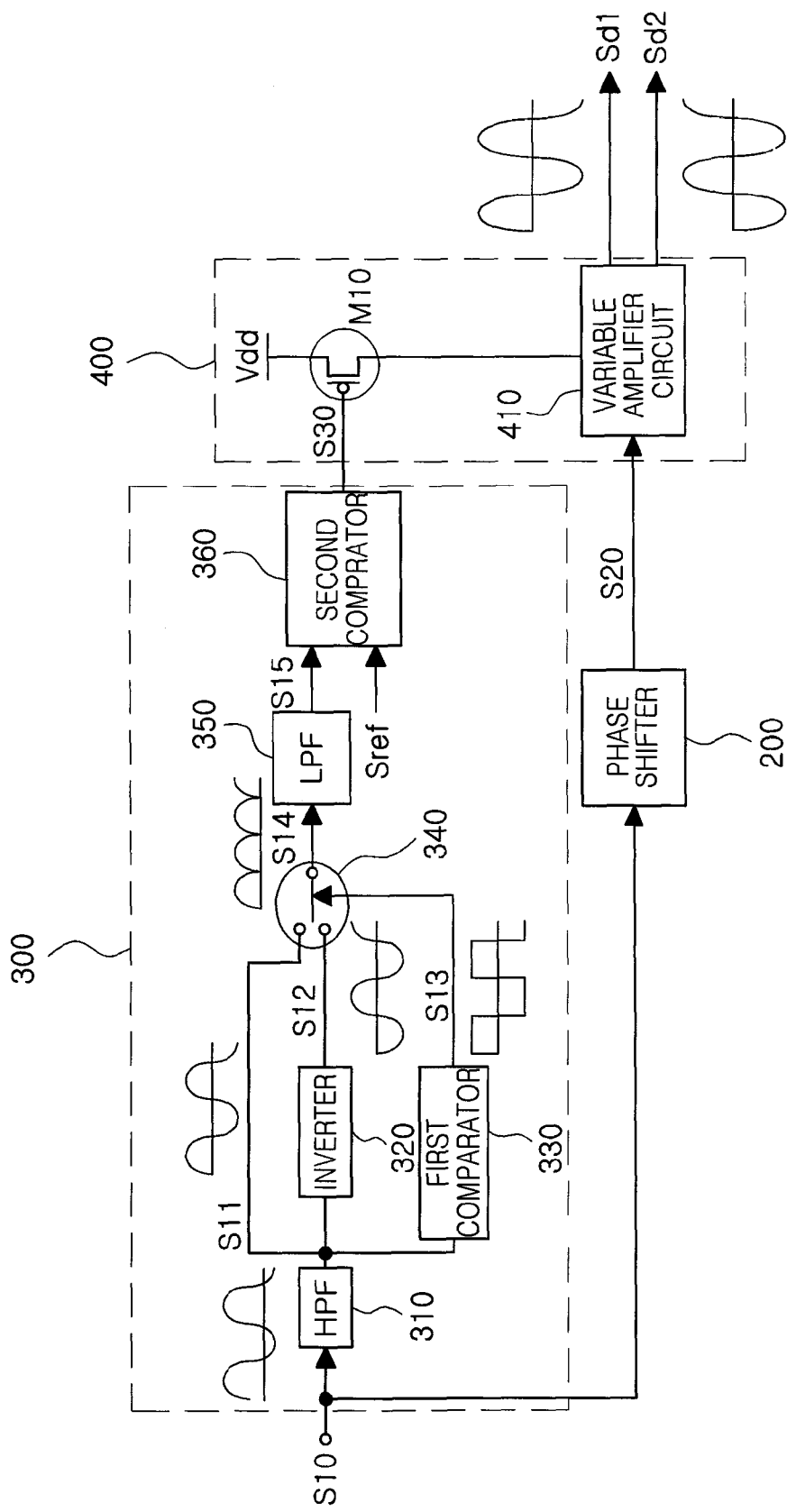
FIG. 2 is a block configuration diagram of an amplitude detector according to an exemplary embodiment of the present invention.

FIG. 2 is a block configuration diagram of an amplitude detector according to an exemplary embodiment of the present invention.

Referring to FIG. 2, the amplitude detector 300 may include a first filter 310 allowing a signal having a predetermined band among signals S10 from the first differential amplifier 100 to pass therethrough; an inverter 320 inverting a signal S11 from the first filter 310; a first comparator 330 generating a switching signal S13 in synchronization with the signal S11 from the first filter 310; a signal selector 340 selecting one of the signal S11 from the first filter 310 and a signal S12 from the inverter 320, depending on the switching signal S13 from the first comparator 330; a second filter 350 allowing a signal having a predetermined band among signals S14 from the signal selector 340 to pass therethrough; and a second comparator 360 comparing a signal S15 from the second filter 350 with a predetermined reference signal Sref, detecting a differential voltage of the compared signals, and providing the differential voltage to the variable gain amplifier 400.

The second comparator 360 may provide the variable gain amplifier 400 with the differential voltage corresponding to a difference in magnitude between the signal S15 from the second filter 350 and the reference signal Sref.

At this time, the gain of the variable gain amplifier 400 is adjusted depending on the differential voltage from the amplitude detector 300, and the variable gain amplifier 400 may amplify a signal S20 from the phase shifter 200 by using the adjusted gain and provide the amplified signal to the driving nodes dxn and dxp of the gyroscope sensor 50.

The variable gain amplifier 400 may include a current regulator M10 adjusting a driving current of the variable gain amplifier 400, which flows into an operating voltage terminal Vdd, depending on the voltage of a signal S30 outputted from the second comparator 360; and a variable amplifier circuit 410 having gain adjusted depending on the driving current adjusted by the current regulator M10.

The current regulator M10 may be configured as a transistor having a drain connected to the operating voltage terminal Vdd, a source connected to a power supply terminal of the variable amplifier circuit 410, and a gate connected to an output terminal of the second comparator 360.

Figure 3:
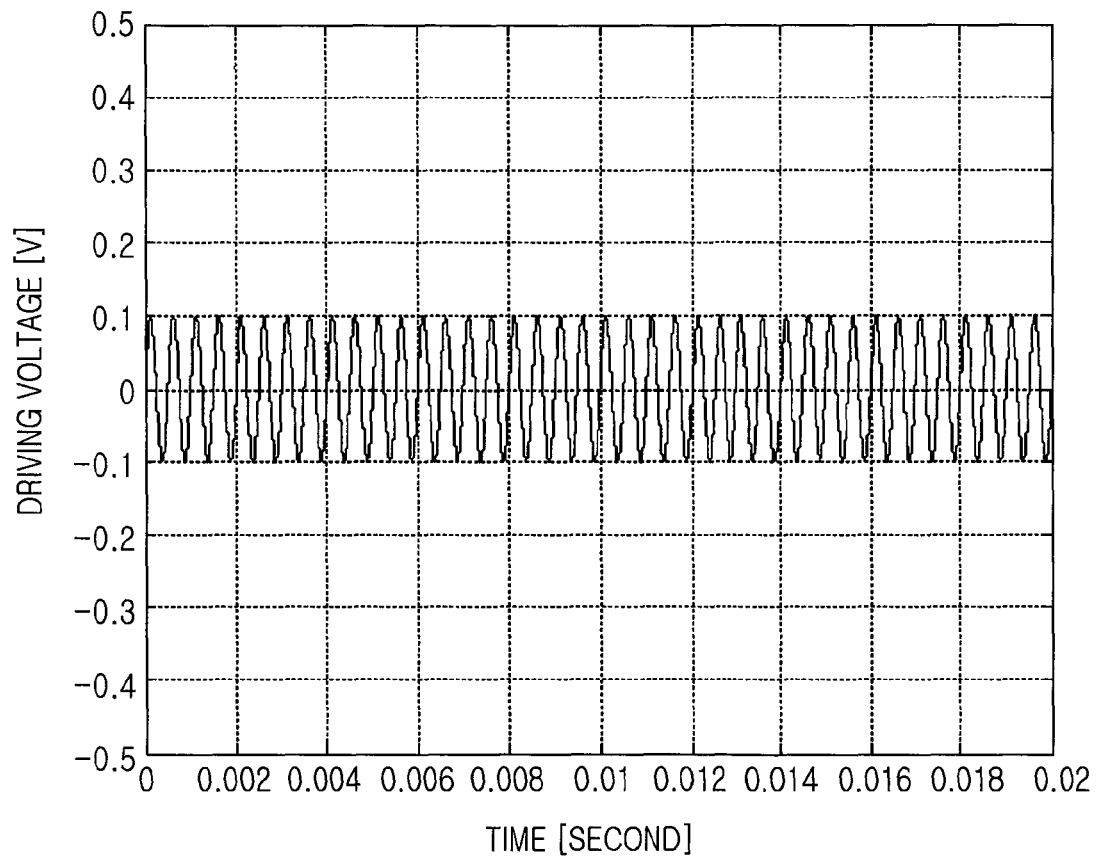
FIG. 3 is a waveform diagram of a driving signal of a gyroscope sensor when automatic gain control (AGC) is not used.
Figure 4:
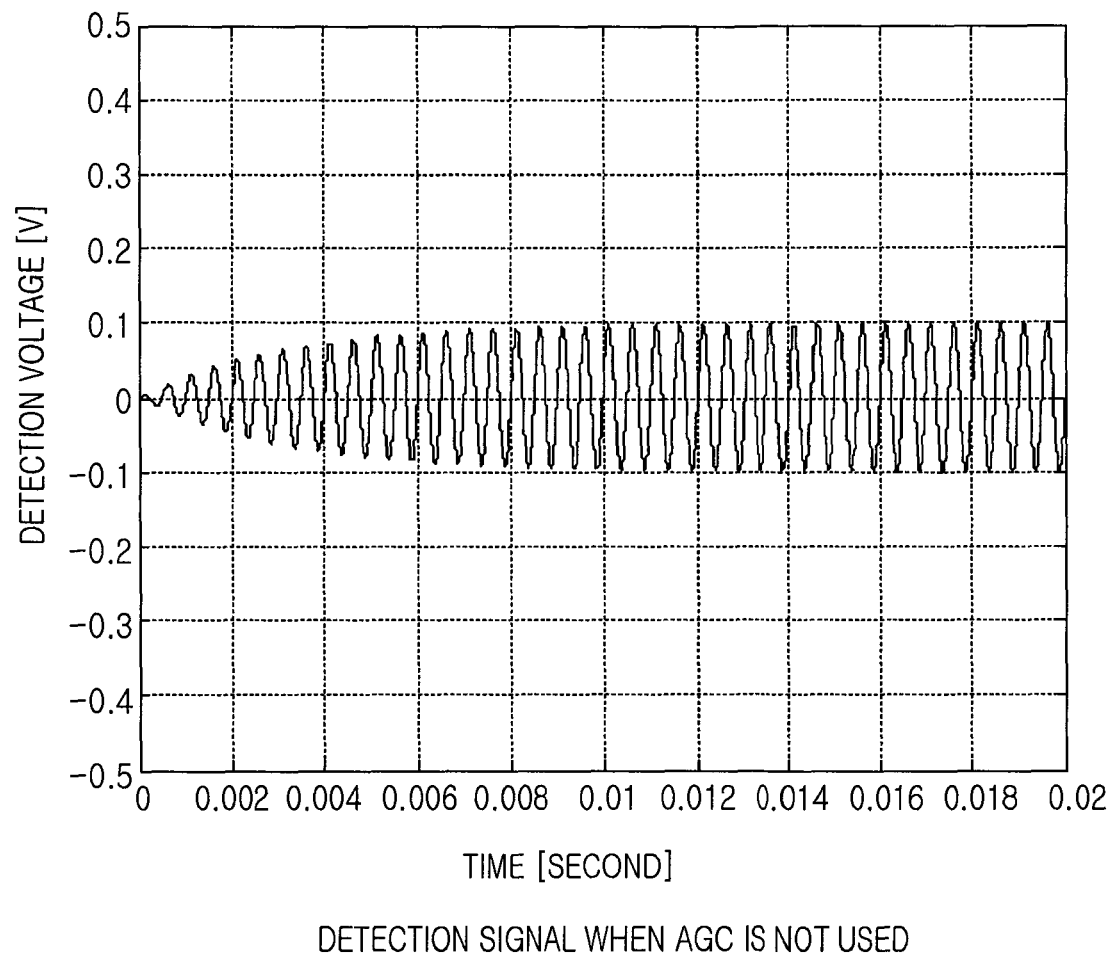
FIG. 4 is a waveform diagram of a detection signal of a gyroscope sensor when AGC is not used.

FIG. 3 is a waveform diagram of a driving signal of a gyroscope sensor when automatic gain control (AGC) is not used. FIG. 4 is a waveform diagram of a detection signal of the gyroscope sensor when AGC is not used.

The waveform diagram of FIG. 3 shows the voltage level of the driving signal of the gyroscope sensor when the AGC is not used.

The waveform diagram of FIG. 4 shows the settling time of the detection signal of the gyroscope sensor when the AGC is not used.

Figure 5:
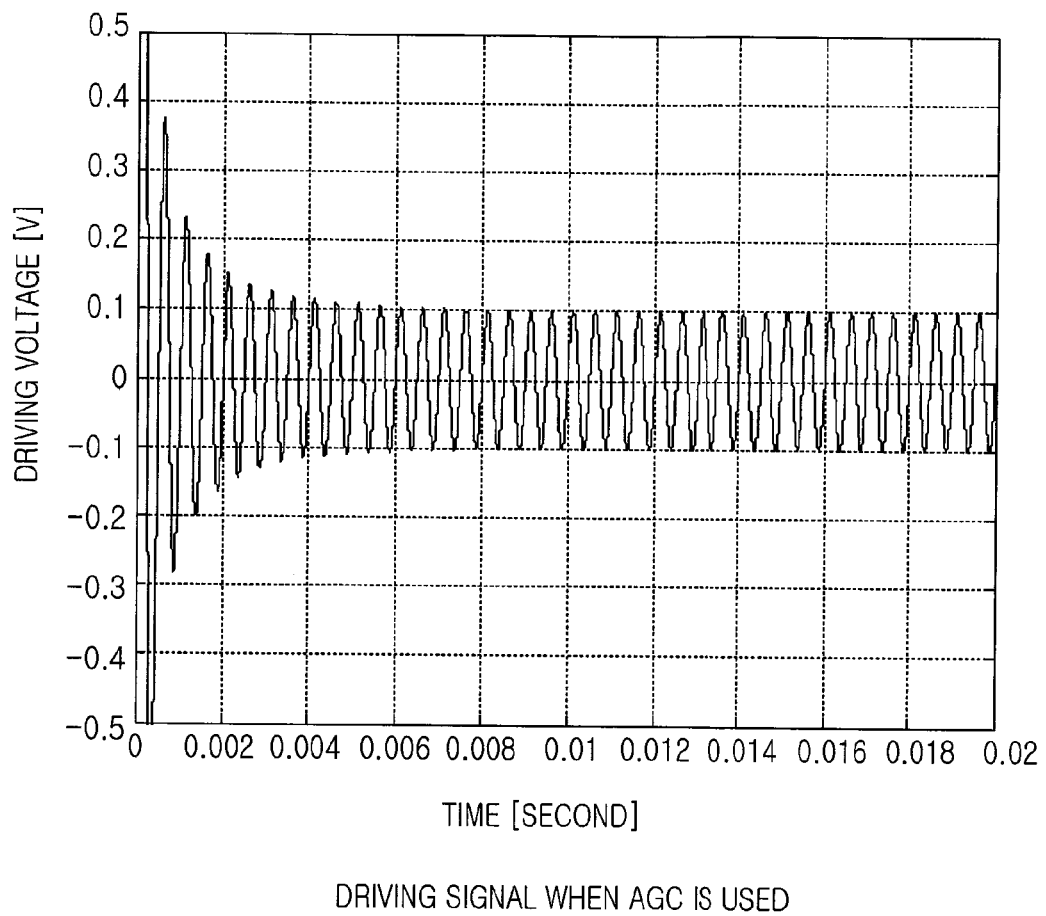
FIG. 5 is a waveform diagram of a driving signal of a gyroscope sensor when AGC is used.
Figure 6:
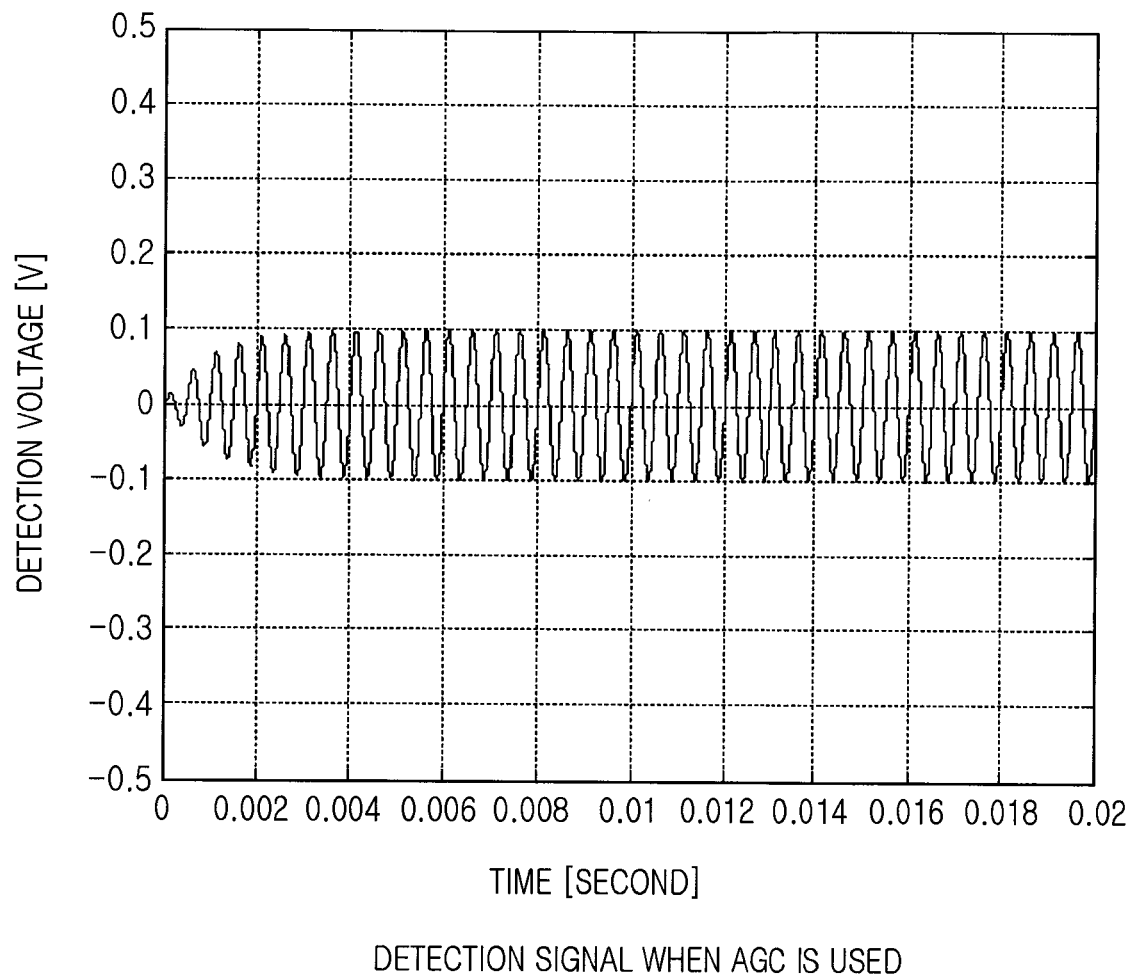
FIG. 6 is a waveform diagram of a detection signal of a gyroscope sensor when AGC is used.

FIG. 5 is a waveform diagram of a driving signal of a gyroscope sensor when AGC is used. FIG. 6 is a waveform diagram of a detection signal of a gyroscope sensor when AGC is used.

The waveform diagram of FIG. 5 shows the voltage level of the driving signal of the gyroscope sensor when the AGC is used.

The waveform diagram of FIG. 6 shows the settling time of the detection signal of the gyroscope sensor when the AGC is used.

Operations and effects of the present invention will be explained with reference to the accompanying drawings.

In the gyroscope sensor circuit illustrated in FIGS. 1 through 6, the gyroscope sensor 50 of the present invention as shown in FIG. 1, is configured as a sensor including the driving nodes dxn and dxp driving amass body of the gyroscope sensor 50 in an x-axis direction, the first sensing nodes sxn and sxp sensing the movement of the mass body in the x-axis direction, and the y-axis second sensing nodes syn and syp sensing acceleration.

When the gyroscope sensor 50 is driven, the first differential amplifier 100 differentially amplifies signals outputted from the first sensing nodes sxn and sxp of the gyroscope sensor 50, and outputs the signal S10 to the phase shifter 200 and the amplitude detector 300.

The phase shifter 200 shifts the signal S10 from the first differential amplifier 100 by a predetermined shift phase, and outputs the signal S20 to the variable gain amplifier 400.

The amplitude detector 300 detects the amplitude magnitude of the signal S10 from the first differential amplifier 100, and outputs the amplitude magnitude to the variable gain amplifier 400.

The variable gain amplifier 400 amplifies the signal S20 from the phase shifter 200 with gain adjusted depending on the amplitude magnitude from the amplitude detector 300, and provides the amplified signal to the driving nodes dxn and dxp of the gyroscope sensor 50.

That is, in order to measure acceleration Ωz using the gyroscope sensor circuit according to the present invention, the mass body of the gyroscope sensor 50 is driven in the x-axis direction by applying driving signals Sd1 and Sd2 to the driving nodes dxn and dxp of the gyroscope sensor 50, and at this time, the first differential amplifier 100 detects the signal outputted from the first sensing nodes sxn and sxp, namely, the magnitude of a differential voltage.

At this time, the amplitude detector 300 detects the amplitude magnitude of the signal from the first differential amplifier 100. When this detected amplitude magnitude is lower than a reference amplitude, the gain of the variable gain amplifier 400 is raised to thereby increase the driving voltage. In contrast, when this detected amplitude magnitude is higher than the reference amplitude, the gain of the variable gain amplifier 400 is reduced.

Here, in order for the gyroscope sensor 50 to perform self-oscillation, the open-loop phase of a feedback circuit should be 180°. Since a 90° phase shift generally occurs in a resonant frequency by the gyroscope sensor, a phase shifter is used to perform a 90° phase shift, thereby causing the open-loop phase of the feedback circuit to be 180°. Moreover, since no signal is detected from the amplitude detector 300 at a start time of the self-oscillation, the gain of the variable gain amplifier 400 is adjusted to the maximum level, thereby allowing the sensor to be rapidly driven.

Specifically, the phase shifter 200 may set the predetermined shift phase to cause the shift phase of a signal in the signal path including the gyroscope sensor 50, the first differential amplifier 100, the phase shifter 200, and the variable gain amplifier 400 to be 180°, in order to satisfy oscillation conditions.

For example, in the case in which a phase shift in the phase shifter 200 is set to be 90° when a phase shift in the gyroscope sensor 50 is 90°, the shift phase of a signal in the signal path including the gyroscope sensor 50, the first differential amplifier 100, the phase shifter 200, and the variable gain amplifier 400 can be 180°, and accordingly, one of the oscillation conditions of the gyroscope sensor can be satisfied.

Also, the variable gain amplifier 400 may have gain, by which an open loop gain in the signal path including the gyroscope sensor 50, the first differential amplifier 100, the phase shifter 200, and the variable gain amplifier 400 is set to be "1" or more, in order to satisfy oscillation conditions.

For example, when an open loop gain in the gyroscope sensor 50, the first differential amplifier 100, and the phase shifter 200 is less than "1", the gain of the variable gain amplifier 400 may be adjusted depending on the amplitude magnitude from the amplitude detector 300, so as to cause the open loop gain in the signal path including the gyroscope sensor 50, the first differential amplifier 100, the phase shifter 200, and the variable gain amplifier 400 to be "1" or more.

Referring to FIG. 2, an exemplary embodiment of the amplitude detector 300 will be explained.

In FIG. 2, the first filter 310 of the amplitude detector 300 allows a signal having a predetermined band among the signals S10 from the first differential amplifier 100 to pass therethrough, and provides the signal to the inverter 320, the first comparator 330, and the signal selector 340.

At this time, the first filter 310 may be a high pass filter (HPF) allowing a signal having a predetermined frequency band more than a predetermined frequency to pass therethrough. In this case, the signal S10 from the first differential amplifier 100 passes through the HPF, and the direct current (DC) offset of the gyroscope sensor circuit is removed.

The inverter 320 inverts the signal S11 from the first filter 310, and provides the signal S12 to the signal selector 340.

The first comparator 330 generates the switching signal S13 in synchronization with the signal S11 from the first filter 310, and outputs the switching signal S13 to the signal selector 340.

The signal selector 340 selects one of the signal S11 from the first filter 310 and the signal S12 from the inverter 320, depending on the switching signal S13 from the first comparator 330, and outputs the selected signal to the second filter 350.

In other words, when the switching signal S13 from the first comparator 330 is "HIGH", the signal selector 340 selects the signal S11 from the first filter 310. When the switching signal S13 from the first comparator 330 is "LOW", the signal selector 340 selects the signal S12 from the inverter 320.

The second filter 350 allows a signal having a predetermined band among the signal S14 from the signal selector 340 to pass therethrough, and provides the signal to the second comparator 360.

For example, when the second filter 350 is configured as a low pass filter (LPF) allowing a signal having a predetermined frequency band lower than a predetermined frequency to pass therethrough, the signals S14 from the signal selector 340 pass through the LPF to be outputted. The signal 15, having passed through the LPF, is proportional to the magnitude of the signal 10 from the first differential amplifier 100.

In other words, when the signal S10 from the first differential amplifier 100 is increased, the voltage of the signal 15 which has passed through the LPF is increased. When the signal S10 from the first differential amplifier 100 is reduced, the voltage of the signal 15 which has passed through the LPF is reduced.

Furthermore, the second comparator 360 compares the signal S15 from the second filter 350 with the reference signal Sref, detects a differential voltage of the compared signals, and provides the differential voltage to the variable gain amplifier 400.

For example, when the signal S15 from the second filter 350 is higher than the reference signal Sref, the voltage of the signal S30 outputted from the second comparator 360 is increased. Accordingly, a driving current of the variable gain amplifier 400 is reduced to thereby lower the gain of the variable gain amplifier 400.

In contrast, when the signal S15 from the second filter 350 is lower than the reference signal Sref, the voltage of the signal S30 outputted from the second comparator 360 is also reduced. Accordingly, the driving current of the variable gain amplifier 400 is increased to thereby raise the gain of the variable gain amplifier 400.

Through this feedback process, the mass body of the gyroscope sensor may be driven at a constant velocity, and the magnitude of a driving signal may be adjusted depending on the operating voltage Vdd.

More specifically, the second comparator 360 may provide the variable gain amplifier 400 with the differential voltage corresponding to a difference in magnitude between the signal S15 from the second filter 350 and the reference signal Sref.

At this time, the gain of the variable gain amplifier 400 is adjusted depending on the differential voltage from the amplitude detector 300, and the variable gain amplifier 400 may amplify the signal S20 from the phase shifter 200 by using the adjusted gain and provide the amplified signal to the driving nodes dxn and dxp of the gyroscope sensor 50.

As described above, when the driving of the gyroscope sensor starts, there is no signal S10 from the first differential amplifier 100, and thus, the signal S15 from the second filter 350 has a voltage of a lowermost level.

In this state, the voltage of the signal S30 outputted from the second comparator 360 is set to the lowermost level. Accordingly, the maximum amount of current is provided through the current regulator M10 of the variable gain amplifier 400, so that the gain of the variable amplifier circuit 410 is maximized.

Referring to FIGS. 3 and 4, a driving signal and a detection signal of a gyroscope sensor when AGC is not used will be explained.

Referring to the waveform diagram of the driving signal illustrated in FIG. 3, the voltage level of the driving signal of the gyroscope sensor when the AGC is not used is constant throughout. Referring to the waveform diagram of the detection signal illustrated in FIG. 4, when the AGC is not used, it takes a relatively long time, approximately 10 msec, to stabilize the detection signal of the gyroscope sensor.

In contrast, referring to FIGS. 5 and 6, a driving signal and a detection signal of a gyroscope sensor when AGC is used will be explained.

Referring to the waveform diagram of the driving signal illustrated in FIG. 5, when the AGC is used, the driving signal of the gyroscope sensor starts with a relatively high voltage at a start time, and the driving voltage is gradually reduced and stabilized to a proper driving voltage.

Accordingly, referring to the waveform diagram of the driving signal illustrated in FIG. 6, when the AGC is used, the detection signal of the gyroscope sensor is stabilized within a relatively short time, approximately 3 msec.

That is, referring to FIGS. 3 through 6, the settling time of the gyroscope sensor circuit according to the present invention may be minimized by driving the gyroscope sensor with high gain and high current at a start time. In gyroscope sensor circuits in which AGC is not used, according to the related art, a signal is stabilized after 10 msec or more. However, in the gyroscope sensor circuit in which AGC is used, according to the exemplary embodiment of the present invention, an output signal may be stabilized at approximately 3 msec.

Meanwhile, when the gyroscope sensor circuit of the present invention includes the second differential amplifier 500 and the acceleration detection circuit 600, the second differential amplifier 500 differentially amplifies the signals sy1 and sy2 outputted from the second sensing nodes syn and syp of the gyroscope sensor 50 and provides the signal S50 to the acceleration detection circuit 600.

Furthermore, the acceleration detection circuit 600 detects the acceleration Ωz by using the signal S50 from the second differential amplifier 500.

According to exemplary embodiments of the invention, as set forth above, a gyroscope sensor circuit applicable to mobile terminals such as cameras or cell phones is capable of maintaining constant amplitude in a driving signal of a gyroscope sensor, decreasing the influence of temperature, and reducing settling time by using AGC.

While the present invention has been shown and described in connection with the exemplary embodiments, it will be apparent to those skilled in the art that modifications and variations can be made without departing from the spirit and scope of the invention as defined by the appended claims.

What is claimed is:

1. A gyroscope sensor circuit for a gyroscope sensor including sensing nodes and driving nodes, the gyroscope sensor circuit comprising:

a differential amplifier configured to differentially amplify signals respectively outputted from the sensing nodes of the gyroscope sensor;

a phase shifter configured to shift a signal from the differential amplifier by a predetermined shift phase;

an amplitude detector configured to detect an amplitude of the signal from the differential amplifier; and a variable gain amplifier configured to
amplify the shifted signal from the phase shifter with a gain adjusted depending on the amplitude from the amplitude detector, and
provide the amplified signal to the driving nodes of the gyroscope sensor, wherein the amplitude detector is configured to
compare a signal generated by filtering the signal from the differential amplifier with a predetermined reference signal, and
detect a differential voltage between the compared signals as the amplitude of the signal from the differential amplifier, and the amplitude detector comprises:
a first filter configured to pass a signal having a first predetermined band among signals from the differential amplifier;
an inverter configured to invert the signal from the first filter;
a first comparator configured to generate a switching signal in synchronization with the signal from the first filter;
a signal selector configured to select one of the signal from the first filter and the signal from the inverter, depending on the switching signal from the first comparator;
a second filter configured to pass a signal having a second predetermined band among signals from the signal selector; and
a second comparator configured to
compare the signal from the second filter with the predetermined reference signal,
detect the differential voltage of the compared signals, and
provide the differential voltage to the variable gain amplifier.

2. The gyroscope sensor circuit according to claim 1, wherein the phase shifter is configured to set the predetermined shift phase to cause a 180° shift phase of a signal in a signal path including the gyroscope sensor, the differential amplifier, the phase shifter, and the variable gain amplifier.

3. The gyroscope sensor circuit according to claim 2, wherein the variable gain amplifier has the gain adjusted such that an open loop gain in the signal path including the gyroscope sensor, the differential amplifier, the phase shifter, and the variable gain amplifier is set to be "1" or more.

4. The gyroscope sensor circuit according to claim 1, wherein the variable gain amplifier comprises:
a current regulator configured to adjust a driving current of the variable gain amplifier, which flows into an operating voltage terminal of the variable gain amplifier, depending on the differential voltage outputted from the second comparator; and
a variable amplifier circuit having the gain adjusted depending on the driving current adjusted by the current regulator.

5. The gyroscope sensor circuit according to claim 4, wherein the current regulator is configured as a transistor having a drain connected to the operating voltage terminal, a source connected to a power supply terminal of the variable amplifier circuit, and a gate connected to an output terminal of the second comparator.

6. A gyroscope sensor circuit for a gyroscope sensor including first sensing nodes, second sensing nodes, and driving nodes, the gyroscope sensor circuit comprising:
   a first differential amplifier configured to differentially amplify signals outputted from the first sensing nodes of the gyroscope sensor;
   a phase shifter configured to shift a signal from the first differential amplifier by a predetermined shift phase;
   an amplitude detector configured to detect an amplitude of the signal from the first differential amplifier;
   a variable gain amplifier configured to
      amplify the shifted signal from the phase shifter with a gain adjusted depending on the amplitude from the amplitude detector, and
      provide the amplified signal to the driving nodes of the gyroscope sensor;
   a second differential amplifier configured to differentially amplify signals outputted from the second sensing nodes of the gyroscope sensor; and
   an acceleration detection circuit configured to detect an acceleration based on a signal from the second differential amplifier, wherein
   the amplitude detector is configured to
      compare a signal generated by filtering the signal from the differential amplifier with a predetermined reference signal, and
      detect a differential voltage between the compared signals as the amplitude of the signal from the differential amplifier, and
   the amplitude detector comprises:
      a first filter configured to pass a signal having a first predetermined band among signals from the first differential amplifier;
      an inverter configured to invert the signal from the first filter;
      a first comparator configured to generate a switching signal in synchronization with the signal from the first filter;
      a signal selector configured to select one of the signal from the first filter and the signal from the inverter, depending on the switching signal from the first comparator;
      a second filter configured to pass a signal having a second predetermined band among signals from the signal selector; and
      a second comparator configured to
         compare the signal from the second filter with the predetermined reference signal,
         detect the differential voltage of the compared signals, and
         provide the differential voltage to the variable gain amplifier.

7. The gyroscope sensor circuit according to claim 6, wherein the phase shifter is configured to set the predetermined shift phase to cause a 180° shift phase of a signal in a signal path including the gyroscope sensor, the first differential amplifier, the phase shifter, and the variable gain amplifier.

8. The gyroscope sensor circuit according to claim 7, wherein the variable gain amplifier has the gain adjusted such that an open loop gain in the signal path including the gyroscope sensor, the first differential amplifier, the phase shifter, and the variable gain amplifier is set to be "1" or more.

9. The gyroscope sensor circuit according to claim 6, wherein the variable gain amplifier comprises:
   a current regulator configured to adjust a driving current of the variable gain amplifier, which flows into an operating voltage terminal of the variable gain amplifier, depending on the differential voltage outputted from the second comparator; and
   a variable amplifier circuit having the gain adjusted depending on the driving current adjusted by the current regulator.

10. The gyroscope sensor circuit according to claim 9, wherein the current regulator is configured as a transistor having a drain connected to the operating voltage terminal, a source connected to a power supply terminal of the variable amplifier circuit, and a gate connected to an output terminal of the second comparator.

11. The gyroscope sensor circuit according to claim 1, wherein
   the first filter includes a high pass filter, and
   the second filter includes a low pass filter.

12. The gyroscope sensor circuit according to claim 6, wherein
   the first filter includes a high pass filter, and
   the second filter includes a low pass filter.

13. A gyroscope sensor circuit for a gyroscope sensor including sensing nodes and driving nodes, the gyroscope sensor circuit comprising:
   a first differential amplifier configured to differentially amplify signals respectively outputted from the sensing nodes of the gyroscope sensor;
   a phase shifter configured to shift a signal from the first differential amplifier by a predetermined shift phase;
   an amplitude detector configured to detect an amplitude of the signal from the first differential amplifier; and
   a variable gain amplifier configured to
      amplify the shifted signal from the phase shifter with a gain adjusted depending on the amplitude from the amplitude detector, and
      provide the amplified signal to the driving nodes of the gyroscope sensor, wherein the amplitude detector includes
      a first filter configured to pass a signal having a first predetermined band among signals from the first differential amplifier,
      an inverter configured to invert the signal from the first filter,
      a first comparator configured to generate a switching signal in synchronization with the signal from the first filter,
      a signal selector configured to select one of the signal from the first filter and the signal from the inverter, depending on the switching signal from the first comparator,
      a second filter configured to pass a signal having a second predetermined band among signals from the signal selector, and
      a second comparator configured to
         compare the signal from the second filter with a predetermined reference signal,
         detect a differential voltage of the compared signals, and
         provide the differential voltage to the variable gain amplifier.

14. The gyroscope sensor circuit according to claim 13, wherein
   the first filter includes a high pass filter, and
   the second filter includes a low pass filter.

15. The gyroscope sensor circuit according to claim 13, wherein the variable gain amplifier includes
- a current regulator configured to adjust a driving current of the variable gain amplifier, which flows into an operating voltage terminal of the variable gain amplifier, depending on the differential voltage outputted from the second comparator; and
- a variable amplifier circuit having the gain adjusted depending on the driving current adjusted by the current regulator.

16. The gyroscope sensor circuit according to claim 15, wherein the current regulator is configured as a transistor having
- a drain connected to the operating voltage terminal,
- a source connected to a power supply terminal of the variable amplifier circuit, and
- a gate connected to an output terminal of the second comparator.

17. The gyroscope sensor circuit according to claim 13, further comprising:
- a second differential amplifier configured to differentially amplify signals outputted from further sensing nodes of the gyroscope sensor; and
- an acceleration detection circuit configured to detect an acceleration based on a signal from the second differential amplifier.

* * * * *